(12) United States Patent
Lagerblom et al.

(10) Patent No.: US 6,654,426 B2
(45) Date of Patent: Nov. 25, 2003

(54) CORRECTION OF NONLINEARITY OF I/Q MODULATOR

(75) Inventors: Niklas Lagerblom, Espoo (FI); Mika Rättö, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/962,615

(22) Filed: Sep. 26, 2001

(65) Prior Publication Data

US 2002/0024398 A1 Feb. 28, 2002

Related U.S. Application Data

(63) Continuation of application No. PCT/FI00/00247, filed on Mar. 24, 2000.

(30) Foreign Application Priority Data

Mar. 26, 1999 (FI) .................................................. 990680

(51) Int. Cl.[7] .................................................. H04K 1/02
(52) U.S. Cl. ...................................................... 375/296
(58) Field of Search ................................ 375/296, 295, 375/297; 330/149, 136; 455/126, 127; 332/162

(56) References Cited

U.S. PATENT DOCUMENTS 5,381,108 A * 1/1995 Whitmarsh et al. ......... 330/107
5,903,611 A * 5/1999 Schnabl et al. ............. 375/296
6,246,286 B1 * 6/2001 Persson ...................... 330/136

FOREIGN PATENT DOCUMENTS

| EP | 433 863 | 6/1991 |
| EP | 503 588 | 9/1992 |
| EP | 598 585 | 5/1994 |
| EP | 608 577 | 8/1994 |
| EP | 658 975 | 6/1995 |
| EP | 823 805 | 2/1998 |
| WO | WO 97/49174 | 12/1997 |

* cited by examiner

Primary Examiner—Khai Tran
(74) Attorney, Agent, or Firm—Pillsbury Winthrop LLP

(57) ABSTRACT

A method and an arrangement for correcting nonlinearity of an I/Q modulator in a linearization circuit of an amplifier (8) of a transmitter, which circuit comprises an I/Q modulator (7), a predistorter (3), and a feedback arrangement (9, 12, 13, 14, 15 and 17), the arrangement comprising means (9) for sampling the I/Q-modulated measuring signal, which is formed from the measuring signals fed into the I- and Q-branches of the transmitter, means (14) for A/D-converting the signal samples taken from the signal, means (15) for I/Q-demodulating the signal samples digitally into I- and Q-feedback signals, means (17) for determining the nonlinearities of the I- and Q-branches of the I/Q modulator, and means (4A, 4B, 16A and 16B) for predistorting the I- and Q-signals supplied to the I/Q modulator (7) separately by means of the determined nonlinearities.

8 Claims, 1 Drawing Sheet

CORRECTION OF NONLINEARITY OF I/Q MODULATOR

This application is a Continuation of International Application PCT/FI00/00247 filed on Mar. 24, 2000, which designated the U.S. and was published under PCT Article 21(2) in English.

BACKGROUND OF THE INVENTION

The invention relates to correction of nonlinearity caused by an I/Q modulator in a transmitter.

In new radio systems, the scarcity of radio frequencies makes it necessary to use spectrum-efficient modulation methods. In Europe, a new radio system standard has been developed for PMR (Professional Mobile Radio) users, called TETRA (Terrestrial Trunked Radio). $\pi$/4-DQPSK ($\pi$/4-shifted Differential Quadrature Phase Shift Keying) has been selected as the modulation method of the system. As far as a transmitter is concerned, a drawback to the modulation method is the variation in the amplitude of the envelope of a radio frequency signal, which causes InterModulation (IM) in a nonlinear amplifier. The IM results spread the spectrum of a transmitted signal and thus tend to reduce the gain obtained from using the linear modulation method. The IM results cannot usually be filtered since they are formed extremely close to the desired signal. With constant-amplitude modulation methods, no spreading of the spectrum occurs; therefore, the signal can be amplified by a nonlinear amplifier.

A trunked PMR system, wherein different user groups share the same radio channels, has stringent requirements regarding adjacent channel interference caused by a transmitter. These requirements necessitate good linearity in the transmitter of the radio system used.

In a power amplifier, good linearity is only achieved with poor efficiency. However, the efficiency of portable equipment should be as high as possible for the operation time to be sufficient and in order not to waste battery capacity. In addition, at least relatively good efficiency is required of power amplifiers at base stations in order to avoid cooling problems. Sufficient efficiency and linearity can only be achieved by linearizing the transmitter.

If the nonlinearities of an amplifier were known in advance, it would be possible to form inverse functions of the nonlinearities to convert the input signal, whereby the nonlinearities would be cancelled. The characteristics of the amplifier do not, however, stay the same but they change due to, for example, aging, warming up, and according to the radio channel and power level used. In addition, amplifiers have individual differences. Linearization methods are needed that are capable of adjusting adaptively to changing conditions. Research has been conducted on many different linearization methods, and three have been found to possess characteristics suitable for practical radio systems. These methods are feedforward, cartesian feedback and predistortion. A linearization method can also be adaptive.

Thus, if the nonlinear transfer function of the amplifier is known and if it does not vary as a function of time, the signal to be transmitted can be linearized by applying to the signal a suitable transfer function causing predistortion. Hence, the signal outputted from the amplifier can be made linear. This method is called predistortion. At baseband, for example, predistortion can be carried out by using a lookup table (LUT) into which are stored conversion parameters causing predistortion, i.e. predistortion parameters, in which case the conversion parameters to be used at a given time are selected on the basis of the amplitude of the signal to be predistorted.

However, the I/Q modulator of the transmitter causes an error in the system, which is due to different nonlinearity of the I- and Q-branches of the I/Q modulator. An I/Q modulator operates on a quadrature modulation basis. It enables two independent signals to be combined in the transmitter and be transmitted on the same transmission band and the signals to be separated again at the receiver. The principle of quadrature modulation is that two separate signals, I and Q (Inphase and Quadrature phase), are modulated by using the same carrier wave frequency, but the phases of the carrier waves differ from each other in that the carrier wave of signal Q lags 90° the carrier wave of signal I. After modulation, the signals are summed. Thanks to the phase difference, the I- and Q-signals can be separated from each other when the sum signal is demodulated. Distortion caused by the different nonlinearity of the I- and Q-branches of the I/Q modulator can make measuring the nonlinearity of the amplifier difficult; therefore, the distortion is to be removed. In accordance with the prior art, the input level of the I/Q modulator is, if necessary, retained so low that potential distortion components do not affect the measurement of the amplifier harmfully. Consequently, the output signal supplied from the I/Q modulator must correspondingly be amplified more, which causes broadband noise in the system. Indeed, the I/Q modulator can be the greatest generator of noise in a chain of amplifiers. In such as case, the requirements of high linearity and low level of broadband noise are contradictory.

BRIEF DESCRIPTION OF THE INVENTION

An object of the invention is thus to provide a method and an arrangement implementing the method so as to enable the above-mentioned problems to be solved. The objects of the invention are achieved by a method of correcting nonlinearity of an I/Q modulator in a linearization circuit of an amplifier of a transmitter, which circuit comprises an I/Q modulator for I/Q-modulating a signal to be transmitted, a predistorter for linearizing the amplifier, and a feedback arrangement for determining parameters of the predistorter of the amplifier, the method being characterized by comprising the steps of determining the nonlinearities of I- and Q-branches of the I/Q modulator, and predistorting the I- and Q-signals supplied to the I/Q modulator separately by means of the determined nonlinearities of the I- and Q-branches of the I/Q modulator in order to compensate for the nonlinearity of the I/Q modulator.

The invention is based on the idea that nonlinearities of the I- and Q-branches of the I/Q modulator are determined and compensated for by predistorting the I- and Q-signals separately.

An advantage of the method of the invention is that the I/Q modulator can be controlled using a higher level and used within a more advantageous operation range, whereby less harmful noise occurs. In addition, the correction of the nonlinearity of the amplifier is retained as a unique block in the system as the nonlinearity of the I/Q modulator is corrected by a separate block. This is preferable since it is likely that a single nonlinearity can be more readily described in, for example, a digital application than several combined nonlinearities, because a combined transfer function of several nonlinear elements more likely comprises more drastic changes than single transfer functions of the elements.

According to a preferred embodiment of the invention, nonlinearities are determined by feeding a measuring signal to the I-branch of the transmitter and a zero signal to the Q-branch thereof, sampling the I/Q-modulated signal to be transmitted, A/D-converting the signal samples taken from the signal to be transmitted, I/Q-demodulating the signal samples digitally into I- and Q-feedback signals, determining the nonlinearity of the I-branch of the I/Q modulator on the basis of the I-feedback signal and the corresponding measuring signal fed into the I-branch of the transmitter, feeding the measuring signal into the Q-branch of the transmitter and the zero signal into the I-branch thereof, sampling the I/Q-modulated signal to be transmitted, A/D-converting the signal samples taken from the signal to be transmitted, I/Q-demodulating the signal samples digitally into I- and Q-feedback signals, and determining the nonlinearity of the Q-branch of the I/Q modulator on the basis of the Q-feedback signal and the corresponding measuring signal fed into the Q-branch of the transmitter. Alternatively, nonlinearities can be determined by feeding a measuring signal into the I- and Q-branches of the transmitter, sampling the I/Q-modulated signal to be transmitted, A/D-converting the signal samples taken from the signal to be transmitted, I/Q-demodulating the signal samples digitally into I- and Q-feedback signals, determining the nonlinearity of the I-branch of the I/Q modulator on the basis of the I-feedback signal and the corresponding measuring signal fed into the I-branch of the transmitter, and determining the nonlinearity of the Q-branch of the I/Q modulator on the basis of the Q-feedback signal and the corresponding measuring signal fed into the Q-branch of the transmitter.

When the feedback signal is I/Q-demodulated digitally, in which case the I/Q demodulation does not cause nonlinearity to the signal, the nonlinearity caused by the I/Q modulator can be determined by means of the feedback signals since the feedback signals comprise nonlinearity caused by the I/Q modulator only. In addition, the same feedback branch can be used for determining the nonlinearity of the amplifier and the nonlinearity of the I/Q modulator. This simplifies the structure of the predistortion system of the transmitter, and, as fewer components are needed, also saves costs.

The invention further relates to an arrangement for correcting nonlinearity of an I/Q modulator in a linearization circuit of an amplifier of a transmitter, which circuit comprises an I/Q modulator for I/Q-modulating a signal to be transmitted, a predistorter for linearizing the amplifier, and a feedback arrangement for determining parameters of the predistorter of the amplifier, the arrangement being characterized in that the arrangement comprises means for sampling the I/Q-modulated measuring signal to be transmitted, which is formed from the measuring signals fed into the I- and Q-branches of the transmitter, means for A/D-converting the signal samples taken from the signal to be transmitted, means for I/Q-demodulating the signal samples digitally into I- and Q-feedback signals, means for determining the nonlinearities of the I- and Q-branches of the I/Q modulator on the basis of the measuring signal fed into the I- and Q-branches of the transmitter and the I- and Q-feedback signals caused by the measuring signals, and means for predistorting the I- and Q-signals supplied to the I/Q modulator separately by means of the determined nonlinearities of the I- and Q-branches of the I/Q modulator in order to compensate for the nonlinearity of the I/Q modulator. Such an arrangement enables the advantages of the method of the invention to be achieved by a simple structure.

BRIEF DESCRIPTION OF THE DRAWINGS

The invention is now described in connection with the preferred embodiments and with reference to the accompanying drawing showing a block diagram of a transmitter of the invention in accordance with a preferred embodiment thereof.

DETAILED DESCRIPTION OF THE INVENTION

Figure 1:
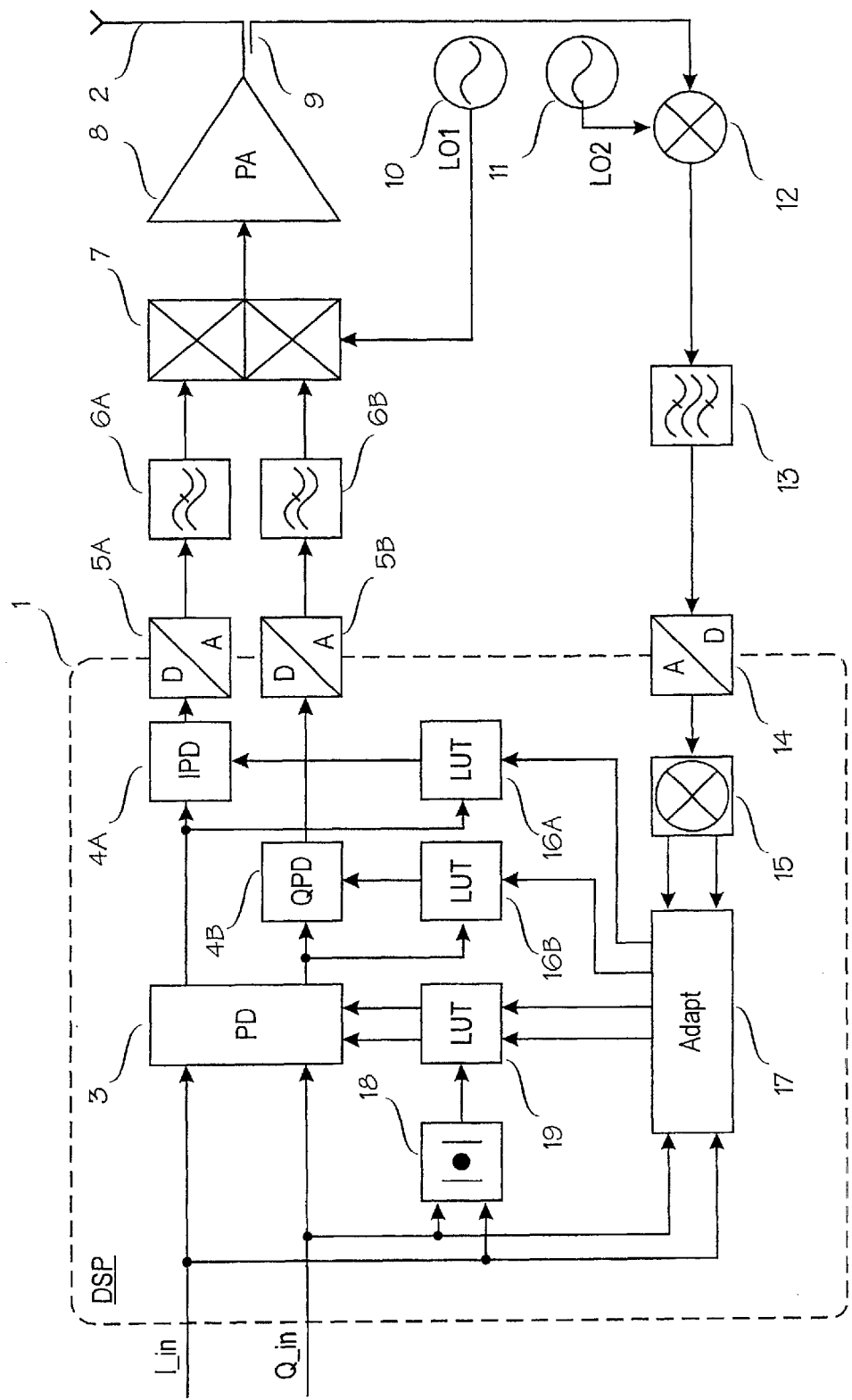

FIG. 1 shows a block diagram of a transmitter of the invention in accordance with a preferred embodiment thereof. It is to be noted that the figure shows only elements relevant for the invention to be understood. In the figure, I- and Q-signals I_IN and Q_IN to be transmitted are supplied to the transmitter. Predistortion 3 carried out to cancel the nonlinearity of an amplifier 8 as well as predistortion 4A and 4B carried out for cancelling the nonlinearity caused by an I/Q modulator 7 are implemented by a digital signal processor (DSP) 1. The predistortions could also be implemented by e.g. an ASIC (Application-Specific Integrated Circuit) circuit; this, however, is irrelevant as far as the basic idea of the invention is concerned. The predistortion of the amplifier 8 is carried out at a predistorter 3 according to correction parameters obtained from a lookup table 19. The predistorted signals are predistorted at the predistorters 4A and 4B of the I- and Q branches of the I/Q modulator 7 in order to compensate for the nonlinearity caused by the I/Q modulator 7. Correcting units 4A and 4B receive the predistortion parameters to be used from memory tables 16A and 16B. The signals obtained from the predistorters 4A and 4B of the I/Q modulator are D/A-converted into analogue signals by D/A converters 5A and 5B, which are also preferably filtered by low-pass reconstruction filters 6A and 6B. These signals are further supplied to the I/Q modulator 7. The I/Q modulator 7 and an I/Q demodulator 15 operate on a quadrature modulation basis, which enables two independent signals to be combined at the transmitter and to be transmitted on the same transmission band, and the signal to be separated again at the receiver. The principle of quadrature modulation is that two separate signals, I and Q (Inphase and Quadrature phase), are modulated by using the same carrier wave frequency, but the phases of the carrier waves differ from each other in that the carrier wave of signal Q lags 90° the carrier wave of signal I. After modulation, the signals are summed. Thanks to the phase difference, the signals I and Q can be separated from each other when the sum signal is demodulated. The signals are modulated and combined at the I/Q modulator 7. The I/Q modulator 7 operates synchronized by a local oscillator 10. The I/Q-modulated signal is supplied to a power amplifier PA8 and further to an antenna 2 to be transmitted. Simultaneously, feedback is formed by means of a sampling arrangement 9, such as a directional coupler. The radio frequency (e.g. 400 MHz) feedback signal is down-mixed to an intermediate frequency of 450 kHz, for example, preferably by a down-mixer 12. Down-mixing is carried out synchronized by a local oscillator 11. The intermediate-frequency signal can, if necessary, be filtered by a broadband filter 13, and also attenuated. The intermediate-frequency signal is sampled by an A/D converter 14 for baseband (or intermediate frequency) processing. This is preferably carried out by using undersampling (sampling frequency 162 kHz, for example); this, however, is irrelevant as far as the basic idea of the invention is concerned. Undersampling means that the signal to be sampled is sampled at a lower frequency than the Nyquist frequency. As is known, undersampling can be used if the band of the signal to be sampled is sufficiently restricted. The advantage of using undersampling in the A/D conversion 14 is, for example, that less memory is needed in the conversion than in normal sampling (or oversampling). In addition, the use of undersampling does not usually require additional procedures since the band of the signal supplied to the A/D converter is typically already restricted. The band of the signal can be restricted, if necessary, by potential passband filtering 13.

The I/Q demodulator 15 is implemented by a digital signal processor 1 (or by an ASIC circuit, for example). The A/D-converted intermediate-frequency feedback signal is I/Q-demodulated by digitally multiplying into baseband I- and Q-feedback signals by the I/Q demodulator 15. The I/Q demodulator is thus implemented by software at the digital signal processor 1. The digitally implemented I/Q demodulator 15 does not cause distortions to the signal, as an analogue I/Q demodulator would. The baseband I- and Q-feedback signals are conveyed to a computing unit 17 wherein the predistortion table 19 is generated. The manner in which the predistortion table 19 of the amplifier 8 is generated is irrelevant to the invention. The determination of the nonlinearity and the generation of the predistortion table 19 of the amplifier 8 are preferably carried out after the nonlinearity of the I/Q modulator 7 has been determined and compensated for, as will be described later in the present description, in which case the nonlinearity of the I/Q modulator 7 does not affect the measurement of the nonlinearity of the amplifier 8 harmfully. The computing unit 17 also receives signals I_IN and Q_IN supplied to the transmitter to be transmitted. The actual predistortion of the amplifier 8 is carried out by means of the predistortion table 19. At a unit 18, an absolute value, i.e. the amplitude of the signal, is determined from a complex signal comprising signals I_IN and Q_IN. This amplitude data is fed to the amplitude predistortion table 19, which, on the basis of the amplitude data, gives the corresponding correction parameters to the predistorter 3. Being irrelevant to the basic idea of the invention, the predistortion method used may differ from the method disclosed above.

Regardless of how the above-described predistortion 3 carried out to linearize the amplifier 8 has been implemented, the determination and correction according to the invention of the nonlinearity caused by the I/Q modulator 7 is carried out in, for example, the following manner: by first feeding a measuring signal into the I-branch of the transmitter and a zero signal to the Q-branch. A measuring signal is a signal comprising different amplitude levels between the zero level and the highest possible level. There can be 128 to 16,384 levels, for example. The more amplitude levels are used, the more accurate the description obtained of the nonlinearity of the I/Q modulator. On the other hand, a high number of the levels slows down the determination of nonlinearity and the memory tables 16A and 16B describing nonlinearity require more memory. The measuring signal fed into the I-branch causes an I-feedback signal to the computing unit 17. The nonlinearity caused by the I/Q modulator 7 is expressed such that it amplifies signals of different amplitude levels differently, i.e. the amplitude of the signal is not amplified linearly. Furthermore, the nonlinearities of the I- and Q-branches may be different. The computing unit 17 thus has available the measuring signal fed into the I-branch of the transmitter and the I-feedback signal caused by the measuring signal. The computing unit 17 receives the feedback signal delayed compared with the measuring signal, so the measuring signal is buffered into the memory of the computing unit for the determination of nonlinearity. By means of the amplitude values of the measuring signal and the corresponding values of the feedback signal, the amplification of the I-branch of the I/Q modulator 7 can be determined on different amplitude levels, which describes the nonlinearity of the I-branch. Next, the correction coefficients can be determined for the different amplitude levels such that the amplification differences between the different amplitude levels are compensated for; the nonlinearity is thus cancelled. In other words, an inverse function of the transfer function of the I-branch of the I/Q modulator 7 is determined, on the basis of which the I-signal supplied to the I/Q modulator 7 is then predistorted, whereby the I-branch is linearized. When the correction coefficients have been determined for different amplitude levels, they are fed into the memory table 16A. The memory table 16A controls the predistorter 4A of the I/Q modulator 7 such that the memory table 16A receives information that the signal is supplied to the predistorter 4A and transmits a correction coefficient corresponding to the amplitude of the received signal to the predistorter 4A, which predistorts the signal according to the correction coefficient. The square of the amplitude of the signal to be predistorted or a corresponding variable derived from the amplitude, for example, can also serve as a control parameter of the memory table 16A (and 16B). This is a feasible procedure when, for example, the resolution of the table 16A is to be focused on an amplitude range, on a point wherein the strongest nonlinearity occurs, for example. The predistorter 4A (and 4B) can be, for example, a real multiplying unit to convert the amplitude of the signal according to the correction coefficient received from the memory table 16A. When the correction coefficients of the I-branch have been determined, the correction coefficients of the Q-branch are determined in a corresponding manner: feeding a measuring signal to the Q-branch of the transmitter and a zero signal to the I-branch thereof, and determining the nonlinearity of the Q-branch of the I/Q modulator 7 on the basis of the Q-feedback signal and the corresponding measuring signal fed into the Q-branch of the transmitter. The correction coefficients corresponding to the nonlinearity of the Q-branch are fed into the memory table 16B, which controls the predistorter 4B of the Q-branch of the I/Q modulator 7. The nonlinearities of the I- and Q-branches can also be determined simultaneously by feeding a measuring signal simultaneously into the I- and Q-branches, and determining the nonlinearities of the I- and Q-branches as otherwise described above. Being irrelevant to the basic idea of the invention, the generation of the predistortion tables 16A and 16B can deviate from what has been disclosed above. Instead of correction coefficients discrete in relation to amplitude, inverse functions continuous in relation to amplitude could also be determined for the I- and Q-branches of the I/Q modulator 7, by means of which the signals of the I- and Q-branches supplied to the I/Q modulator are predistorted. Furthermore, instead of the correction table, an approximation describing the nonlinearity of the I- and Q-branches of the I/Q modulator 7 can be used. In such a case, only the parameters of the approximation are obtained by measuring.

The correction parameters of the nonlinearity of the I- and Q-branches of the I/Q modulator 7, i.e. the contents of the memory tables 16A and 16B, can be updated at certain predetermined intervals, for example, or in response to a parameter or to an external request when, for example, the frequency used or some such factor changes. The TETRA system comprises a special linearization time slot reserved for linearizing the transmitter. Hence, in the TETRA system, it is during the linearization time slot when the correction parameters of nonlinearity of the I/Q modulator 7 can be preferably determined. The measurement of the nonlinearity of the I/Q modulator 7 requires that linear errors, such as the DC-offset and phase and amplitude imbalance of the I- and Q-branches, of the I/Q modulator should be compensated for, so the correction of the linear errors is preferably carried out before the nonlinearity is measured. How the linear errors are corrected is irrelevant to the invention. It is also possible to combine the measurement of DC-offset and/or the measurement of amplitude imbalance with the measurement of nonlinearity. In order for the amplifier 8 not to affect the measurement results of the I/Q modulator 7, the transmitter of the amplifier 8 should be within the linear operation range when the nonlinearity of the I/Q modulator 7 is measured. When the nonlinearity of the I/Q modulator 7 has been determined and compensated for, the amplifier 8 can be used normally and the nonlinearity of the amplifier 8 can be measured for the predistortion 3.

Although the use of the invention has been described herein mostly in connection with the TETRA system, there are no restrictions to the use of the invention in systems of other type as well. The structure of the transmitter used may differ from the described one while the basic idea of the invention remains the same. It is obvious to those skilled in the art that the basic idea of the invention can be implemented in many ways as technology progresses. The invention and the embodiments thereof are thus not restricted to the examples described above but they can vary within the scope of the claims.

What is claimed is:

1. A method of correcting nonlinearity of an I/Q (Inphase/Quadrature phase) modulator in a linearization circuit of an amplifier of a transmitter, which circuit comprises an I/Q modulator for I/Q-modulating a signal to be transmitted, a predistorter for linearizing the amplifier, and a feedback arrangement for determining parameters of the predistorter of the amplifier, the method comprising the steps of:

determining the nonlinearities of I- and Q-branches of the I/Q modulator; and predistorting the I- and Q-signals supplied to the I/Q modulator separately by means of the determined nonlinearities of the I- and Q-branches of the I/Q modulator in order to compensate for the nonlinearity of the I/Q modulator.

2. A method as claimed in claim 1, wherein the step of determining the nonlinearities of the I- and Q-branches of the I/Q modulator comprises the steps of:

feeding a measuring signal into the I-branch of the transmitter and a zero signal into the Q-branch thereof;

sampling the I/Q-modulated signal to be transmitted;

A/D-converting the signal samples taken from the signal to be transmitted;

I/Q-demodulating the signal samples digitally into I- and Q-feedback signals;

determining the nonlinearity of the I-branch of the I/Q modulator on the basis of the I-feedback signal and a corresponding measuring signal fed into the I-branch of the transmitter;

feeding a measuring signal into the Q-branch of the transmitter and a zero signal into the I-branch thereof;

sampling the I/Q-modulated signal to be transmitted;

A/D-converting the signal samples taken from the signal to be transmitted;

I/Q-demodulating the signal samples digitally into I- and Q-feedback signals; and determining the nonlinearity of the Q-branch of the I/Q modulator on the basis of the Q-feedback signal and a corresponding measuring signal fed into the Q-branch of the transmitter.

3. A method as claimed in claim 1, wherein the step of determining the nonlinearities of the I- and Q-branches of the I/Q modulator comprises the steps of:

feeding a measuring signal into the I- and Q-branches of the transmitter;

sampling the I/Q-modulated signal to be transmitted;

A/D-converting the signal samples taken from the signal to be transmitted;

I/Q-demodulating the signal samples digitally into I- and Q-feedback signals;

determining the nonlinearity of the I-branch of the I/Q modulator on the basis of the I-feedback signal and a corresponding measuring signal fed into the I-branch of the transmitter; and determining the nonlinearity of the Q-branch of the I/Q modulator on the basis of the Q-feedback signal and a corresponding measuring signal fed into the Q-branch of the transmitter.

4. A method as claimed in claim 1, 2 or 3, wherein the nonlinearities of the I- and Q-branches are determined at predetermined intervals.

5. A method as claimed in claim 1, 2 or 3, wherein the nonlinearities of the I- and Q-branches are determined during a linearization time slot.

6. An arrangement for correcting nonlinearity of an I/Q (Inphase/Quadrature phase) modulator in a linearization circuit of an amplifier of a transmitter, which circuit comprises an I/Q modulator for I/Q-modulating a signal to be transmitted, a predistorter for linearizing the amplifier, and a feedback arrangement for determining parameters of the predistorter of the amplifier, the arrangement comprising:

sampling means for sampling the I/Q-modulated measuring signal to be transmitted, which is formed from the measuring signals fed into the I- and Q-branches of the transmitter;

A/D conversion means for A/D-converting the signal samples taken from the signal to be transmitted;

I/Q demodulation means for I/Q-demodulating the signal samples digitally into I- and Q-feedback signals;

means for determining the nonlinearities of the I- and Q-branches of the I/Q modulator on the basis of the measuring signal fed into the I- and Q-branches of the transmitter and the I- and Q-feedback signals caused by the measuring signals; and predistortion means for predistorting the I- and Q-signals supplied to the I/Q modulator separately by means of the determined nonlinearities of the I- and Q-branches of the I/Q modulator in order to compensate for the nonlinearity of the I/Q modulator.

7. An arrangement as claimed in claim 6, wherein the arrangement is arranged to determine the nonlinearities of the I- and Q-branches at predetermined intervals.

8. An arrangement as claimed in claim 6, wherein the arrangement is arranged to determine the nonlinearities of the I- and Q-branches during a linearization time slot.

* * * * *